United States Patent
Minegishi et al.

(10) Patent No.: US 6,595,889 B2
(45) Date of Patent: Jul. 22, 2003

(54) BELT-TYPE DOOR OPENING AND CLOSING DRIVE APPARATUS

(75) Inventors: Kiyoji Minegishi, Aichi (JP); Jun Tamenaga, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/827,174

(22) Filed: Apr. 6, 2001

(65) Prior Publication Data

US 2001/0029219 A1 Oct. 11, 2001

(30) Foreign Application Priority Data

Apr. 6, 2000 (JP) .................................. 2000-104489
Sep. 29, 2000 (JP) .................................. 2000-299020

(51) Int. Cl.[7] .............................................. F16H 13/06
(52) U.S. Cl. ...................................... 475/183; 475/182
(58) Field of Search ................................ 475/182, 183, 475/186, 195

(56) References Cited

U.S. PATENT DOCUMENTS

| 3,741,024 A | * | 6/1973 | Bouthors et al. | ........... 474/150 |
| 3,889,554 A | * | 6/1975 | Sinclair et al. | ............ 475/183 |
| 5,791,204 A | * | 8/1998 | Torii et al. | .................. 296/223 |
| 6,038,818 A | * | 3/2000 | Haag et al. | .................... 49/360 |

FOREIGN PATENT DOCUMENTS

| JP | 62155365 | * 7/1987 | ................ 475/183 |
| JP | 01299185 | * 12/1989 | ................ 187/324 |
| JP | A-8-130853 | 5/1996 | |

* cited by examiner

*Primary Examiner*—Sherry Estremsky
*Assistant Examiner*—Tisha D. Lewis
(74) *Attorney, Agent, or Firm*—Arent Fox Kintner Plotkin & Kahn, PLLC (57) ABSTRACT

A belt-type door opening and closing drive apparatus is provided, which can reduce the noise and dimensions thereof and make full use of the mechanical safety function in the event of an accident. The belt-type door opening and closing drive apparatus allows the output of a motor unit to drive a belt (timing belt), thereby opening and closing the door of an elevator cage or the like. Between the motor unit and the timing belt, interposed are planetary roller mechanisms for transmitting power by the mutual rotation of sun rollers, a plurality of planetary rollers supported rotatably by carriers and circumscribing the sun rollers, and ring rollers inscribed by the planetary rollers. The planetary roller mechanism receives the output from the motor unit and the output from the planetary roller mechanism is transmitted to the timing belt.

13 Claims, 6 Drawing Sheets

BELT-TYPE DOOR OPENING AND CLOSING DRIVE APPARATUS

DETAILED DESCRIPTION OF THE INVENTION

1. Field of the Invention

The present invention relates to a belt-type door opening and closing drive apparatus to be used such as for opening and closing the doors of an elevator or an automatic door of stores.

2. Description of the Related Art

For example, following apparatuses are conventionally known as a belt-type door opening and closing drive apparatus for opening and closing the doors of an elevator. An apparatus reduces the output of a motor with (multistage) belts and pulleys and allows the reduced output to drive the door opening and closing belt (a cog belt generally referred to as a timing belt), thereby opening and closing the door. Another apparatus allows the reduced output of a geared motor to drive the door opening and closing belt, thereby opening and closing the door.

The opening and closing drive apparatus for opening and closing the door of an elevator is generally provided with a sensor for detecting a person or some object caught in the door opening. In the event the sensor has detected a person or an object caught in the door opening, the drive apparatus is adapted to open the door of the elevator.

Of the conventional drive apparatuses described above, the one which transmits the output of the motor to the door opening and closing belt (the timing belt) in combination of the belts and pulleys is to reduce the rotational rate of the motor by placing pulleys having different diameters on the input and output sides. To set a higher reduction ratio, this requires generally a multistage configuration of the apparatus (since there is a limit to the reduction in diameter of the input pulley and the increase in diameter of the output pulley). This in turn makes it difficult to provide a compact and an inexpensive apparatus.

On the other hand, the one that employs the geared motor can provide a more compact apparatus than that employing a combination of the multistage belts and pulleys. However, the apparatus presents a problem of providing a high level of noise and causing its mechanical safety function not to work in the event of the sensor failure or the like, as described later.

SUMMARY OF THE INVENTION

The present invention was developed in view of the afore-mentioned problems. It is therefore an object of the present invention to provide a drive apparatus for opening and closing the doors of an elevator, the apparatus being capable of providing a mechanical safety function in the case of an accident.

The present invention provides the following belt-type door opening and closing drive apparatuses to thereby overcome the aforementioned problems. That is, provided is a belt-type door opening and closing drive apparatus for allowing an output of a motor unit to drive a belt to thereby open and close a door. The apparatus is adapted such that between the motor unit and the belt, a planetary roller unit having a sun roller, a planetary roller circumscribing the sun roller, and a ring roller with which the planetary roller is inscribed in is interposed. The planetary roller unit receives the output from the motor unit and an output from the planetary roller unit is transmitted to the belt.

In the present invention, the planetary roller unit is interposed as power transmission means between the motor unit and the belt for opening and closing a door. (Here, the belt is a cog belt which is called a timing belt. However, the present invention is not limited to the cog belt. For convenience, the belt is hereinafter referred to as a timing belt.) The planetary roller unit provides a compact shape and a high reduction ratio, thereby allowing the entire drive apparatus to be made easily compact.

In addition, the planetary roller unit itself transmits power by means of mutual rotations (frictional rotations or traction rotations) of the sun roller, the planetary roller, and the ring roller, thereby providing a quiet operation.

Furthermore, the planetary roller unit makes full use of preventing the vibration from being transmitted between the input and the output side by means of the contact surfaces between the rollers. That is, the planetary roller unit cuts off the vibration produced by the motor unit of the input side and otherwise transmitted to the timing belt, and the vibration generated by the timing belt (the doors of the elevator) to be otherwise transmitted to the motor unit. Accordingly, this makes it possible to prevent the occurrence of the so-called resonance phenomenon in which objects vibrating at natural frequencies different from each other are affected by each other to produce a greater vibration or noise than that produced by each of the objects. Consequently, it is made possible to significantly increase the quietness of the entire drive apparatus.

Furthermore, the planetary roller unit is characterized by its structure that will cause each roller to slide upon application of an excessive load to the output side, thereby allowing no more torque to be transmitted. If the sensor system fails to detect a person or an object caught in the opening between the doors and stop or reverse the rotation of the motor shaft, leading to a situation where the motor unit continues to work with the person or object being caught in the opening, the present invention makes it possible to prevent the excessive torque from being acted upon the person or object being caught in the opening. In other words, the present invention can make full use of the mechanical safety function in the event of an accident. This function is effective particularly when a special emphasis is placed on the response speed of opening and closing the door and therefore a relatively high torque is required of the motor.

Incidentally, the motor unit may include a flat motor having a shortened axial dimension.

Employing such a flat motor for the motor unit makes it possible to reduce the axial dimension(size), thereby allowing the axial dimension of the entire drive apparatus to be further reduced while the properties of the planetary roller unit are being put to use.

Furthermore, the aforementioned planetary roller unit may be of a frame rotational type having a rotational frame member on an outer periphery of the unit itself. The frame member may be coupled to the ring roller so as to rotate integrally therewith, and the frame member itself may be provided with a pulley for driving the belt.

With this configuration, the need for providing a separate pulley in addition to the drive unit is obviated since the frame member itself, which is rotatably integrally coupled to the ring roller, is provided with a pulley for driving the timing belt. Thus, compared with a drive apparatus having a separate pulley connected thereto, this configuration can make the drive system more compact, simplify the structure, reduce the number of components, and contribute to the reduction of cost.

In this case, the ring roller and the frame member may be integrated with each other by a exterior member 100 penetrating the ring roller to the frame member or an extended portion of the frame member.

With this configuration, the exterior member 100 that penetrates the ring roller is supported with the frame member at both axial ends of the ring roller, thereby making it possible to provide improved rigidity for the integration of the ring roller with the frame member.

In addition, irrespective of the number of stages of the planetary roller units, the ring roller and the frame member can be easily integrated with each other.

Furthermore, the drive apparatus can be configured such that multiple stages of the planetary roller units are provided and the output from the motor unit is received by the sun roller of an initial stage planetary roller unit of the multiple stages of planetary roller units. Moreover, the carrier for supporting the planetary roller of a planetary roller unit of a preceding stage including the initial stage is coupled in turn to the sun roller of a following stage planetary roller unit, and then the carrier of a final stage planetary roller unit is fixed. Still moreover, at least the ring roller of the final stage planetary roller unit is integrally rotatably coupled to the frame member, thereby making the frame member rotatable.

With this configuration, due to the multiple stages of the planetary roller units, it is possible to easily provide a high reduction ratio while preventing the outer diameter of the entire drive apparatus from becoming larger. In addition, since the number of frictional contacts between the rollers is increased, it is possible to improve the safety function provided by the sliding of the rollers, and the performance of absorbing vibrations. Furthermore, arranging a plurality of stages of the planetary roller units side by side in the axial direction improves the bearing function of the planetary roller unit itself, thereby further improving the rotational stability of the frame member.

Furthermore, the drive apparatus may be configured such that the planetary roller unit secures a carrier for supporting the planetary roller to the motor unit, a mounting flange for mounting the drive apparatus to an exterior member 100 is formed on the carrier opposite to the planetary roller unit, and the mounting flange is used as part of a casing of the motor unit.

This configuration requires a smaller space for installation than the configuration in which a separate mounting base is fixedly provided on the motor unit side.

Furthermore, the mounting flange is directly integrated with the carrier of the planetary roller unit. Therefore, the mounting flange can be secured to the exterior member 100 of an elevator cage or the like, thereby making it possible to shorten the distance from the bolt of the mounting flange to where a load is applied to the frame member. This makes it possible to reduce the reactive moment acted upon the mounting base when compared with the configuration in which the separate mounting base is fixedly provided on the motor unit side, thereby making it possible to reasonably design the drive apparatus with high installation stability.

Additionally in this configuration, since the mounting flange formed on the carrier of the planetary roller unit is also employed as a part of the motor unit casing, thereby reducing the number of components. In addition to this, the motor unit and the planetary roller unit can be highly integrated with each other, thereby making it possible to improve the rigidity of the entire apparatus.

In addition, to rotate the frame member and the ring roller integrally, the drive apparatus may be configured such that a bearing is disposed between an outer periphery of the carrier for supporting the planetary roller of the planetary roller unit and an inner periphery of the frame member or an extended portion of the frame member.

That is, when the frame member and the ring roller are rotated integrally, the reactive force or load inputted from the driven member side to the frame member is directly acted upon the ring roller via the frame member. In general, with a simple planetary structure using a traction roller, a load (particularly a thrust load) from the ring roller side impairs smooth rotations of each roller, resulting in increased vibrations or noise. This configuration employs a simple planetary structure using a traction roller to implement "quietness". Thus, the integral rotation of the frame member and the ring roller would otherwise cause the problem of being subject to an increased bad influence of the load from the frame member.

The following very simple configuration provides a solution to this problem. That is, the bearing is disposed between the outer periphery of the carrier (secured to the exterior member 100) and the inner periphery of the frame member or the extended portion of the frame member.

Such an arrangement of the bearing allows the frame member or an output member to be supported via the bearing directly by the carrier secured to the exterior member 100. Therefore, even when the frame member is acted upon by a load from the driven member side, the load can be received via the bearing, the carrier, and the exterior member 100. This allows the ring roller not to be affected by the load, thereby making it possible to always provide smooth rotations. Incidentally, the extended portion of the frame member is not necessarily extended integrally, and a separate member may be coupled to the frame member to form an "extended portion".

Incidentally, this configuration is also applicable to a power transmission apparatus having multiple stages of planetary roller units. In this case, the sun roller of the initial stage planetary roller unit among the multiple stages of the planetary roller units may be adapted to receive the power inputted from the input shaft. Then, the carrier of the preceding stage planetary roller unit, including the initial stage, is in turn coupled to the sun roller of the following planetary roller unit. Then, the carrier of the final stage planetary roller unit is made securable to the exterior member 100, and at least the ring roller is rotatably coupled in one piece to the frame member, thereby making the frame member rotatable. Then, the frame member is extended in the axial direction from the ring roller of the final stage planetary roller unit to dispose a bearing between the outer periphery of the final stage carrier and the inner periphery of the frame member.

Incidentally, this bearing can also be used such that the axial movement of the frame member is prevented via the bearing with respect to the carrier secured to the exterior member, and due to the presence of the bearing, a transmission of the thrust load acted from the frame member to the planetary roller unit is cut.

In general, a simple planetary structure using the traction roller is characterized in that the thrust load has structurally a more deleterious effect on the structure than the radial load. This structure has the bearing between the carrier and the frame member, and the structure itself is capable of coping with a reactive force in the direction of the thrust to some extent. If, however, such a structure is in particular positively employed in which the axial movement of the frame member with respect to the carrier is prevented via the bearing, the structure makes it possible to rotate the ring roller with stability even when a thrust load is acted upon the ring roller from the frame member side.

Incidentally, in this case, a thrust bearing may not be particularly employed as the bearing itself, that is, a general ball bearing or a roller bearing may be employed. This also makes it possible to provide such a structure as to cope with a thrust load if the bearing is incorporated into the apparatus such that the axial movement of the inner and outer ring of the bearing is positively prevented (for example, via a step, a stopper ring, or the like) with respect to the carrier and the frame member (which will be described later).

On the other hand, it is more preferable to construct the drive apparatus as follows. That is, a flange is fixedly coupled to an end portion of the carrier opposite to the planetary roller unit, the carrier supporting the planetary roller of the planetary roller unit, and a center bearing is disposed about the axial center of the flange. The disposed center bearing supports an end of the motor shaft and the motor shaft is extended to penetrate the carrier and coupled to the sun roller. Furthermore, the center bearing and the bearing function of the planetary roller unit itself are employed to support an output member integrated with the ring roller rotatably around the extended motor shaft.

That is, with this structure, the rotational output from the motor unit is inputted as it is to the sun roller via the motor shaft. On the other hand, the frame member is made rotatable about the extended motor shaft by means of the center bearing and the bearing function of the roller unit itself and is supported by the motor unit in a combined or integrated fashion. Consequently, it is made possible to provide a motor-equipped power transmission unit, which is compact in the axial direction and has a high rigidity of assembly.

Incidentally, the drive apparatus may also be configured such that the motor shaft is extended from the center bearing and supported in a cantilever manner within the casing of the motor unit by the center bearing and the bearing function of the planetary roller unit itself.

This configuration can provide a motor-equipped power transmission unit more compact in the axial direction than the configuration in which another bearing or the like is provided on the end portion of the motor shaft opposite to the center bearing, and the motor shaft is supported at the both axial sides of the rotor (i.e., the configuration for supporting the motor shaft at its both ends).

In addition, only one bearing or the center bearing described above is provided for supporting the motor shaft, thereby reducing the cost of the drive apparatus.

Furthermore, the drive apparatus may also be configured such that a plurality of stages of planetary roller units are arranged side by side on the extended motor shaft, a plurality of ring-shaped plates are arranged so as to contact with part of or entire surface of axial side of the carrier of each stage, and the axial movement of the carrier is restricted by means of the preceding and following ring-shaped plates.

This configuration prevents the skew of the carrier and provides a smoothed rotation and a quiet operation in a power transmission unit including multiple stages of planetary roller units and having a high reduction ratio.

Furthermore, by using the front and reverse of the ring-shaped plate, the axial movement of the carrier and the planetary roller can be restricted with less number of components.

Furthermore, planetary roller unit can be mounted on the extended motor shaft over a long length, thereby stabilizing the support of the output member with respect to the motor shaft.

The nature, principle, and utility of the invention will become more apparent from the following detailed description when read in conjunction with the accompanying drawings in which like parts are desinated by like reference numerals or characters.

DETAILED DESCRIPTION OF THE PREFERRED EMBODIMENTS

Now, the embodiments of the present invention will be explained below with reference to the drawings.

Figure 1:
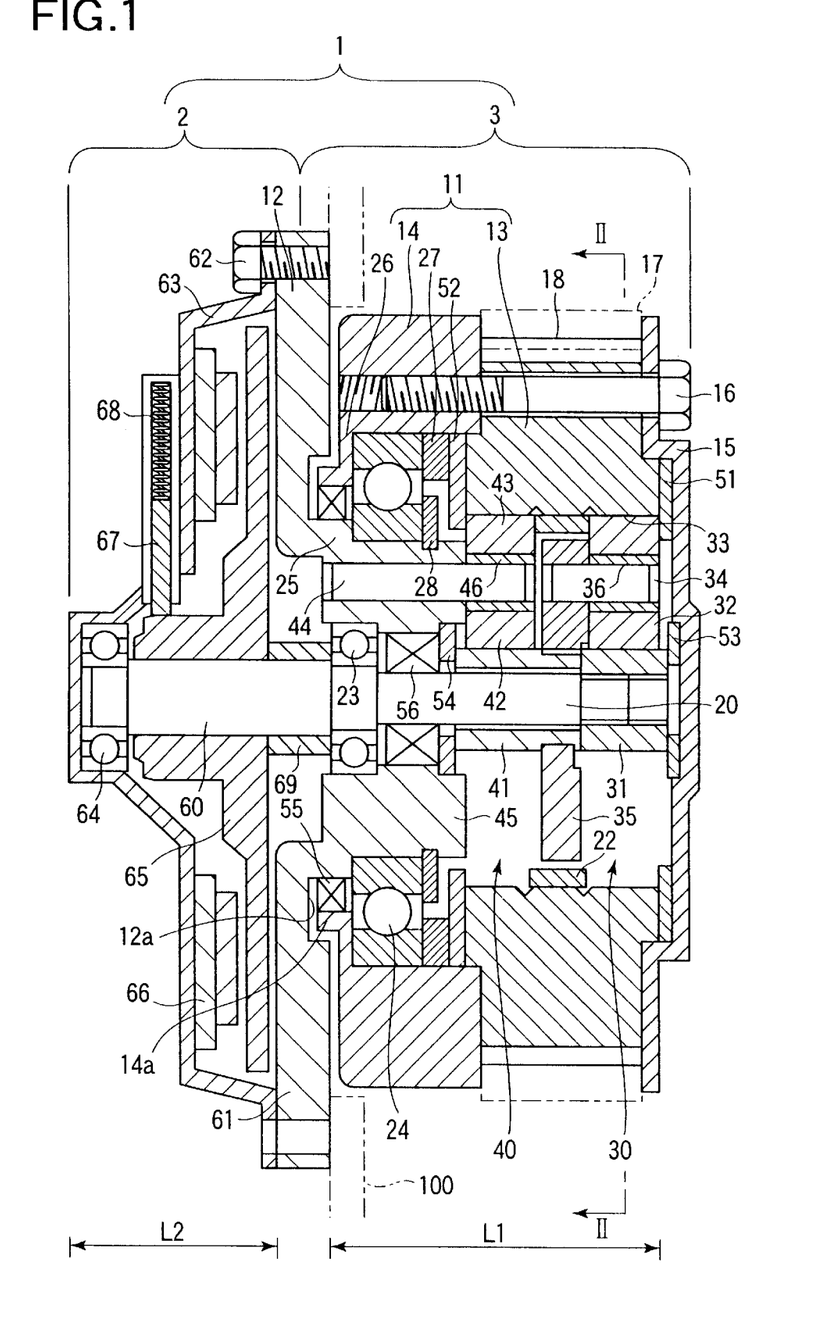
FIG. 1 is a cross-sectional view of a drive unit according to an embodiment of the present invention.
Figure 2:
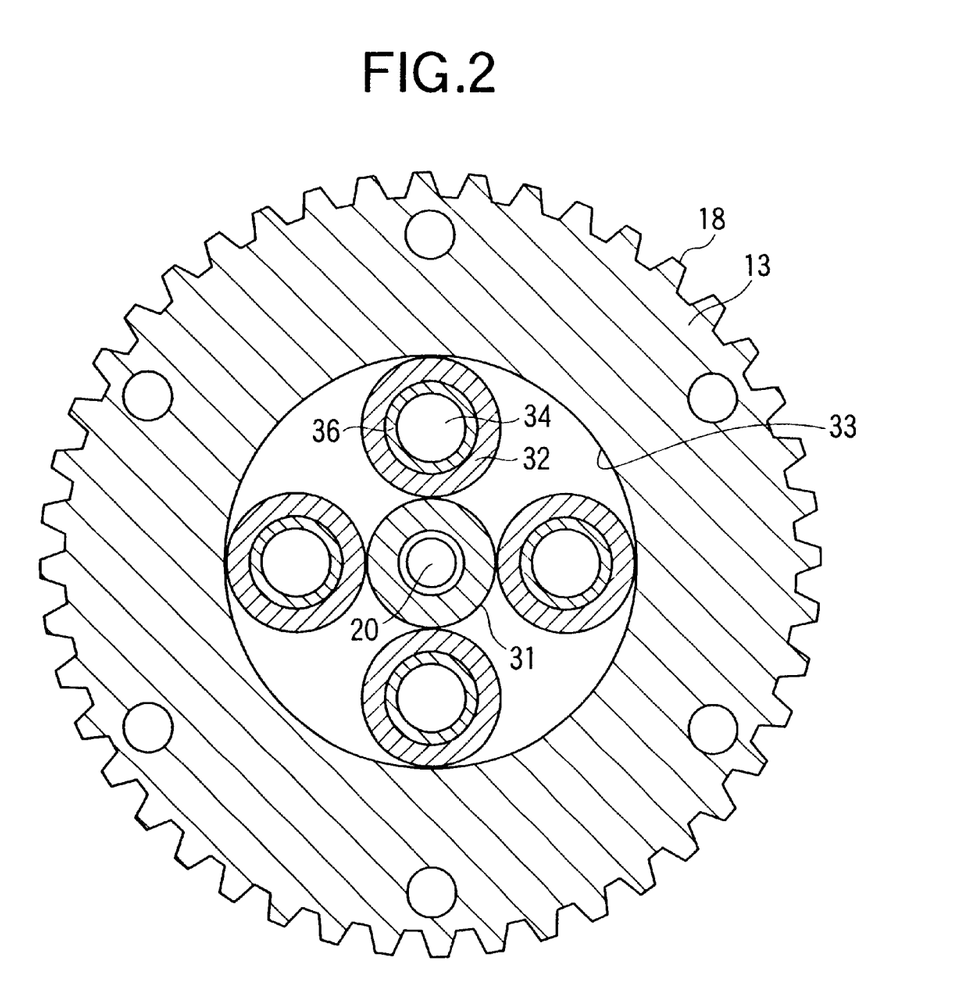
FIG. 2 is a cross-sectional view taken along line II—II of FIG. 1.

FIG. 1 is a cross-sectional view illustrating the configuration of a drive unit 1 for opening and closing the door of an elevator cage (a belt-type door opening and closing drive apparatus for use with an elevator) according to an embodiment. FIG. 2 is a cross-sectional view taken along line II—II of FIG. 1.

As shown in FIG. 1, the drive unit 1 includes a motor unit 2 and a power transmission unit 3, disposed adjacent to each other in the axial direction and combined with each other to form into a single unit. Here, the motor unit 2 includes a flat brush motor having a reduced dimension in its axial direction and the power transmission unit 3 includes two stages of planetary roller mechanisms (planetary roller units).

The power transmission unit 3 employs a configuration for transmitting power by the friction between a plurality of rollers or the shearing stress of the oil sandwiched between rollers, belonging to the type of power transmission generally referred to as a traction drive (T/D).

The power transmission unit 3 includes a rotational casing 11 and a mounting flange 12.

The rotational casing (frame member) 11 includes a rotational frame 13 and a bearing casing 14, both being formed in an annular shape. The rotational frame 13 and the bearing casing 14 are arranged and spigot joined to each other in the axial direction, being integrally coupled to each other with a through-bolt(securing member) 16 in conjunction with an end surface cover 15 for sealing an end surface of the rotational frame 13.

The mounting flange 12 is used to secure the drive unit 1 of this embodiment to an elevator cage (an exterior member) 100, being arranged on the side of the motor unit 2 of the power transmission unit 3. The specific structure of the mounting flange 12 will be described later.

The power transmission unit 3 is of the frame rotational type which takes rotational output from the rotational casing 11 disposed along the outer periphery of the unit. On the outer periphery of the rotational frame 13, there is integrally formed a pulley 18 around which a timing belt 17 is entrained for opening and closing the door of an elevator.

There is disposed an input shaft 20 on the center axis of the rotational frame 13. The input shaft 20, formed by extending a motor shaft 60, is inserted from the motor unit 2 to the power transmission unit 3. In other words, one end portion of the input shaft 20 (the end portion to the left of the figure) also serves as the motor shaft 60.

Inside the rotational frame 13, there are provided two stages of planetary roller mechanisms (planetary roller units) 30, 40 as a first reduction stage and a second reduction stage on the input shaft 20.

The planetary roller mechanism of the first reduction stage (initial stage) (hereinafter referred to as the first planetary roller mechanism) 30 is disposed on the front end side of the input shaft 20 when viewed from the motor unit 2. On the other hand, the planetary roller mechanism of the second reduction stage (final stage) (hereinafter referred to as the second planetary roller mechanism) 40 is disposed closer to the motor unit 2 than the first planetary roller mechanism 30.

As described above, the motor unit 2, the second planetary roller mechanism 40, and the first planetary roller mechanism 30 are disposed in that order adjacent to each other on the same axial line. Furthermore, the output shaft 60 of the motor unit 2 penetrates the axial center of both the planetary roller mechanisms 30, 40 and is inserted as the input shaft 20 into the planetary roller mechanism 30, which is arranged at the farthermost position from the motor unit 2.

The first planetary roller mechanism 30 includes a cylindrical sun roller 31 spline-coupled to the front end portion of the input shaft 20, a plurality of (in this embodiment, four) planetary rollers 32 circumscribing the sun roller 31, and a ring roller 33 in which the planetary rollers 32 inscribe. The first planetary roller mechanism 30 also include a carrier 35 for rotatably supporting all the planetary rollers 32 each via a carrier pin 34, and transmits power by the mutual rotation of the three parties, namely, the sun roller 31, the planetary rollers 32, and the ring roller 33.

The second planetary roller mechanism 40 includes a cylindrical sun roller 41 loosely fit on the outer periphery of the input shaft 20 and spline-coupled to the carrier 35 of the first planetary roller mechanism 30. The second planetary roller mechanism 40 also includes a plurality of planetary rollers 42 circumscribing the sun roller 41, a ring roller 43 with which the planetary rollers 42 is inscribed in, and a carrier 45 for rotatably supporting all the planetary rollers 42 each via a carrier pin 44. With this configuration, the second planetary roller mechanism 40 transmits power by the mutual rotation of the three parties, namely, the sun roller 41, the planetary rollers 42, and the ring roller 43.

The carrier pins 34, 44 of the first and second planetary roller mechanisms 30, 40 are cantilever-supported at each proximal end portion with the carriers 35, 45, which are arranged closer to the motor unit 2 than each of the planetary rollers 32, 42. On the outer periphery of the distal end portion of the carrier pins 34, 44, there are rotatably provided planetary rollers 32, 42 via each of sliding members (pin rollers) 36, 46.

The ring rollers 33, 43 of the first and second planetary roller mechanisms 30, 40 are formed integrally in the inner periphery of the rotational frame 13. To standardize the components, the size of the sun rollers 31, 41 of the first and second planetary roller mechanisms 30, 40, the size of the planetary rollers 32, 42, and the size of the ring rollers 33, 43 are made equal to each other, respectively.

A spacer 22, fit into the inner periphery of the rotational frame 13, ensures a certain space between the planetary rollers 32 of the first planetary roller mechanism 30 and the planetary rollers 42 of the second planetary roller mechanism 40. The carrier 35 of the first planetary roller mechanism 30 is accommodated in this space.

The axial position of each of the planetary rollers 32, 42 is restricted with a stopper ring 51 that fits into the end surface cover 15, the aforementioned spacer 22, and the a stopper ring 52 that fits into the inner periphery of the bearing casing 14. The axial position of the sun rollers 31, 41 is restricted with a stopper ring 53 that fits into the end surface cover 15 and a stopper ring 54 that fits the inner periphery of the carrier 45 of the second planetary roller mechanism 40.

The carrier 45 of the second planetary roller mechanism 40 has a cylindrical shape. There is disposed a rolling bearing (central bearing) 23 between the inner periphery of the carrier 45 and the outer periphery of the input shaft 20. There is also disposed a rolling bearing 24 between the outer periphery of the carrier 45 and the inner periphery of the bearing casing 14 or a portion of the rotational casing (frame member) 11.

With this configuration, the bearings 23, 24 of the outer and inner periphery of the carrier 45 allow the input shaft 20 to be rotatably supported by the carrier 45, and the rotational casing 11 including the rotational frame 13 and the bearing casing 14 to be rotatably supported by the carrier 45. In addition, since the first and second planetary roller mechanisms 30, 40 themselves serve as a bearing, the rotational vibration of the input shaft 20 and the rotational casing 11 is prevented even at a position apart from the bearings 23, 24.

In addition, the rolling bearing 24 interposed between the carrier 45 and the bearing casing 14 is fixed so as to prevent its axial movement with respect to the carrier 45 and the bearing casing 14 by means of steps 25, 26, a spacer 27, a snap ring 28 and the like. The bearing 24 is adapted to bear any thrust load applied from the side of the rotational casing 11. Thus, the thrust load can be prevented from being transmitted to the side of the planetary roller mechanisms 30, 40.

Between the carrier 45 and the bearing casing 14, there is also arranged a seal member 55 (described later) for sealing the bearing 24 from outside, disposed at an outer position than the bearing 24 when viewed from the planetary roller mechanisms 30, 40. In addition, between the carrier 45 and the input shaft 20, there is arranged a seal member 56 for sealing the bearing 23 from the side of the motor unit 2, disposed at an inner position than the bearing 23 when viewed from the planetary roller mechanisms 30, 40. In the space defined by the seal members 55, 56, encapsulated is a special grease for improving the traction function of each of the rollers of the planetary roller mechanisms 30, 40.

Now, the structural contrivance of the mounting flange 12 will be explained below including the structural arrangement of the aforementioned seal member 55.

As described above, the mounting flange 12 is used to secure the drive unit 1 according to this embodiment to the exterior member 100 of the elevator cage, being arranged on the side of the motor unit 2 of the power transmission unit 3. The mounting flange 12 is adapted to also serve as a motor base 61 which constitutes part of the casing of the motor unit 2, being disposed orthogonal to the axial direction of the drive unit 1.

The mounting flange 12 is integrally formed on one end of the carrier 45 of the second planetary roller mechanism 40. Thus, by securing the mounting flange 12 to the exterior member 100 on the side of the elevator cage, the carrier 45 of the second planetary roller mechanism 40 is fixedly supported, thereby making it possible to take the rotational output from the rotational casing 11 and allow the motor unit 2 to be secured to the exterior member 100 on the side of the elevator cage via the mounting flange 12.

The side surface of the mounting flange 12 and the end surface of the bearing casing 14 are opposed to each other being spaced apart by a slight gap. An annular projected portion 14a formed on the side surface of the bearing casing 14 is placed within an annular recessed portion 12a formed on the side surface of the mounting flange 12, in no contact with each other.

This is devised to ensure a space for accommodating the seal member 55 for sealing between the bearing casing 14 and the carrier 45, by forming the annular projected portion 14a on the side surface of the bearing casing 14. That is, the annular projected portion 14a is formed in the bearing casing 14 to thereby ensure the space for arranging the seal member 55 on the inner periphery thereof. The annular recessed portion 12a is formed on the side surface of the mounting flange 12 to avoid interference with the annular projected portion 14a.

With such a configuration, it is made possible to provide a sufficient thickness for the mounting flange 12 as well as to arrange the seal member 55 without extending the axial length of the mounting flange 12. Thus, the mounting flange 12 is arranged as close to the bearing casing 14 as possible, thereby providing a reduced axial dimension for the power transmission unit 3.

Now, the configuration of the motor unit 2 will be explained below.

The motor unit 2 includes the flat brush motor as described above, with the motor base 61 and a motor cover 63 constituting the motor casing. The mounting flange 12 itself serves as the motor base 61 as it is.

The motor unit 2 has a basic structure, which is itself publicly known, including the motor shaft 60 integrated with the input shaft 20 of the power transmission unit 3 and a bearing 64 fitted in the central portion of the motor cover 63 to support the end portion of the motor shaft 60 opposite to the power transmission unit 3. The motor unit 2 also includes a thin disc-shaped rotor 65 integrally coupled to the outer periphery of the motor shaft 60 in the motor cover 63 and a stator 66 secured to the inner side surface of the motor cover 63 to oppose the side surface of the rotor 65. The motor unit 2 further includes brushes 67 for supplying current to the coils (not shown) of the rotor 65 and springs 68 for bringing the brushes 67 into contract with the contact of the boss portion of the rotor 65.

Incidentally, between the rotor 65 and the bearing 23 on the outer periphery of the input shaft 20 on the side of the power transmission unit 3, there is provided a spacer 69 for positioning the rotor 65.

Figure 6:
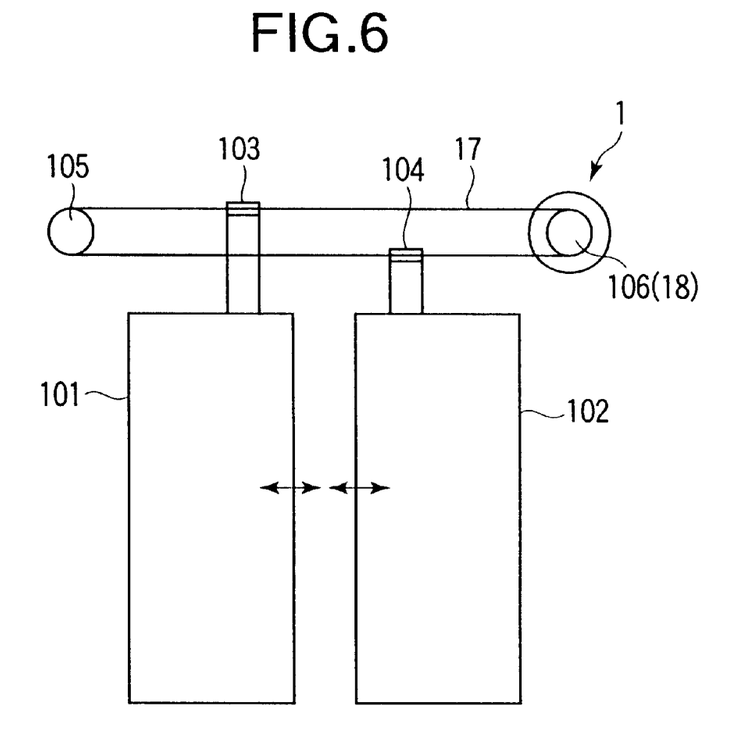
FIG. 6 is a view of a construction showing an example of use of the drive unit according to each of the embodiments.

For example, the drive unit 1 described above is secured to the exterior member 100 of the mounting flange 12, thereby being mounted to the elevator cage as shown in FIG. 6.

FIG. 6 is a view illustrating an example of use of the drive unit 1.

Referring to FIG. 6, reference numerals 101, 102 denote elevator cage doors, 17 the timing belt, and 103, 104 coupling members for coupling between each of the doors and the timing belt. The timing belt 17 is adapted to pass over two pulleys 105, 106, spaced apart from each other. The drive unit 1 is arranged at one of the pulleys or the pulley 106. As the pulley 106, used is the pulley 18 integrally formed on the rotational frame 13 of the rotational casing 11. This mechanism allows the drive unit 1 to drive the timing belt 17, thereby opening and closing the doors 101, 102 in synchronization with each other.

Now, the action of the drive unit 1 will be explained below.

Referring to FIG. 1, rotation of the motor shaft 60 of the motor unit 2 is inputted from the input shaft 20 to the sun roller 31 of the first planetary roller mechanism 30. Now, suppose the rotational frame 13 is stationary. In this case, the mutual frictional rotation of the rollers (traction rotation) allows the rotation inputted to the sun roller 31 to be transmitted from the planetary rollers 32 through the carrier 35, the sun roller 41 of the second planetary roller mechanism 40, and the planetary rollers 42 to the carrier 45 in that order. However, since the carrier 45 is actually stationary, the rotation of the planetary rollers 32, 42 causes the ring rollers 33, 43 or the rotational casing 11 having the rotational frame 13 to rotate, thereby driving the timing belt 17 to open or close the doors 101, 102.

In this case, the power transmission unit 3, with the planetary roller mechanisms 30, 40 built therein, is employed as the power transmission means between the motor unit 2 and the timing belt 17, thereby making it possible to provide a quiet operation. That is, the planetary roller mechanisms 30, 40 are designed to transmit power by means of the mutual rotation (frictional rotation or traction rotation) of the sun rollers 31, 41, the planetary rollers 32, 42, and the ring rollers 33, 43. Accordingly, this design itself provides a very quiet operation. In addition, the planetary roller mechanisms 30, 40 prevent the transmission of vibrations generated by the motor unit 2 toward the timing belt and the transmission of vibrations generated by the timing belt toward the motor unit. Thus, this makes it possible to prevent the occurrence of the so-called resonance phenomenon in which objects vibrating at natural frequencies different from each other are affected by each other to produce a greater vibration or noise than that produced by each of the objects. Consequently, it is made possible to improve the quietness of the entire drive apparatus including the motor unit, the timing belt and so on.

On the other hand, when an excessive load is acted upon the timing belt 17 to close the doors 101, 102, an increase in the load applied to the rotational casing 11 causes each of the rollers 31, 32, 33, 41, 42, and 43 to start sliding. If the sensor system fails to detect a person or an object caught in the opening between the doors 101, 102 and control or stop the rotation of the motor shaft 60, leading to a situation where the motor unit 2 continues to work with the person or object being caught in the opening, the present invention makes it possible to prevent the excessive torque from being acted upon the person or object being caught in the opening. In other words, the present invention can make full use of the mechanical safety function in the event of an accident.

In addition, it is possible to easily make the entire drive system compact because of the compactness and increased reduction ratio of the power transmission unit 3 having the planetary roller mechanisms 30, 40 built therein and employing the flat motor.

Furthermore, since the mounting flange 12 integrated with the carrier 45 is used as part of the casing of the motor unit 2 (the motor base 61), the motor unit 2 and the power transmission unit 3 can be highly integrated with each other while the number of components is reduced. Moreover, since the mounting flange 12 is secured to the exterior member 100 of the elevator cage to thereby install the drive unit 1, it is possible to make the installation compact and the design reasonable.

More specifically, first of all, the mounting flange 12 is disposed intermediate in the axial direction between the planetary roller mechanisms 30, 40 and the motor unit 2, thereby providing shortened cantilever distances L1, L2 from the mounting flange 12. In particular, this results in receiving the radial and thrust load of the rotational frame 13 at positions not too far from the mounting flange 12, thereby making it possible to reduce the reactive moment acted upon a bolt 62 of the mounting flange 12. Thus, this allows the drive unit 1 to be installed to the elevator cage with higher stability when compared with the case where a separate mounting base or the like is provided to the motor unit to secure it.

Furthermore, the employment of the following configurations allows the rotational members (such as the rotor and the frictional rollers) to be assembled around the mounting flange 12 located at the center of the unit. That is, (a) The mounting flange 12, the carrier 45 of the planetary roller mechanism 40, and the motor base 61 of the motor unit 2, each adapted to serve as part of another, are integrally disposed at the center of the drive unit 1, (b) On the base of the mounting flange 12, the motor unit 2 and the multiple stages of planetary roller mechanisms 30, 40 are disposed adjacent to each other on the same axial line in the order of the motor unit 2, the planetary roller mechanism (the final stage) 40, and the planetary roller mechanism (the initial stage) 30, (c) The output shaft 60 of the motor unit 2 penetrates the axial center of all the planetary roller mechanisms 30, 40 so as to be inserted as the input shaft 20 into the first stage planetary roller mechanism 30, which is disposed at the farthermost position from the motor unit 2, and (d) The carrier 45 of the (final stage) planetary roller mechanism 40 is secured to the motor unit 2 (which is integrated with the mounting flange 12).

This makes it possible to keep the rigidity of the assembly of the rotational members high and further improve the rotational stability and the stability of installation to the elevator cage.

In addition, the rotational frame 13, which rotates integrally with the ring rollers 33, 43, is provided directly with the pulley 18 (106) for driving the timing belt 17. This obviates the need for providing a separate pulley in addition to the drive unit 1, makes the drive system more compact, simplifies the structure, reduces the number of components, and contributes to the reduction of cost.

Furthermore, the rolling bearing 24 is intentionally interposed between the bearing casing 14 and the carrier 45, which constitute the rotational casing 11. This makes it possible to reduce the burden imposed on the planetary roller mechanisms 30, 40 and improve the stability of supporting the rotation of the rotational casing 11. That is, the rolling bearing 24 is adapted to receive all the thrust load and part of the radial load acted upon the rotational casing 11. This makes it possible to allow the planetary rollers 32, 42 to rotate with stability even when installed to be subject to a large thrust or radial load.

In addition, the drive unit 1 is provided with the two stages of the planetary roller mechanisms 30, 40. This makes it possible to provide a high reduction ratio and increase the number of frictional contact portions between rollers, thereby improving the safety provided by the sliding of the rollers and the vibration absorption performance.

Furthermore, arranging the two stages of planetary roller mechanisms 30, 40 side by side in the axial direction allows the planetary roller mechanisms 30, 40 themselves to improve the bearing function and the rotational casing 11 to rotate with higher stability.

Incidentally, the two stages of planetary roller mechanisms 30, 40 are provided for the drive unit 1 according to the aforementioned embodiment. However, one stage of planetary roller mechanism or three stages or more may be provided therein. To employ three stages or more in the drive unit 1, the sun roller of the initial stage planetary roller mechanism among the multiple stages of planetary roller mechanisms may be adapted to receive the output rotation of the motor unit. Then, the carrier of the preceding stage planetary roller mechanism, including the initial stage, may be in turn coupled to the sun roller of the following planetary roller mechanism. Then, the carrier of the final stage planetary roller mechanism may be fixed and all the ring rollers of the planetary roller mechanism of each stage may be rotatably coupled in one piece to the rotational frame. Even in this case, it is also possible to interpose the bearing 24 between the outer periphery of the final stage carrier and the inner periphery of the bearing casing 14. In addition, all the ring rollers of each stage may be coupled or only part of the rollers including those of the final stage may be coupled.

Figure 3:
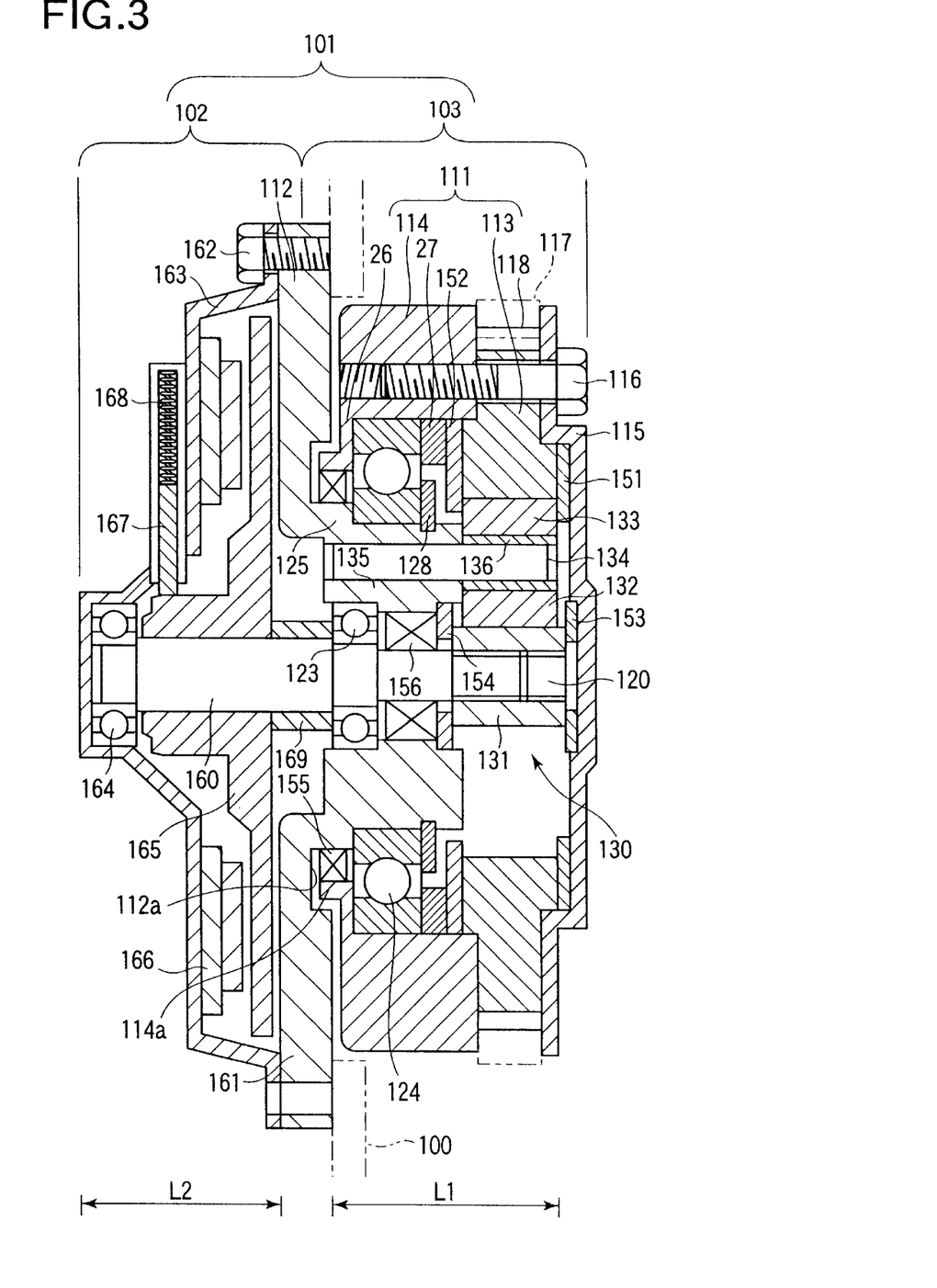
FIG. 3 is a cross-sectional view of a drive unit showing a second embodiment of the present invention.

FIG. 3 is a view illustrating an example of one stage of planetary roller mechanism according to a second embodiment. This example has in principle the same configuration as that of the previous embodiment except that the number of planetary roller mechanisms is changed from two stages to one. Accordingly, the components same as or similar to those of FIG. 3 are given the reference numerals, the lower two digits of which are the same as those of the previous embodiment, and will not be repeatedly explained.

Figure 4:
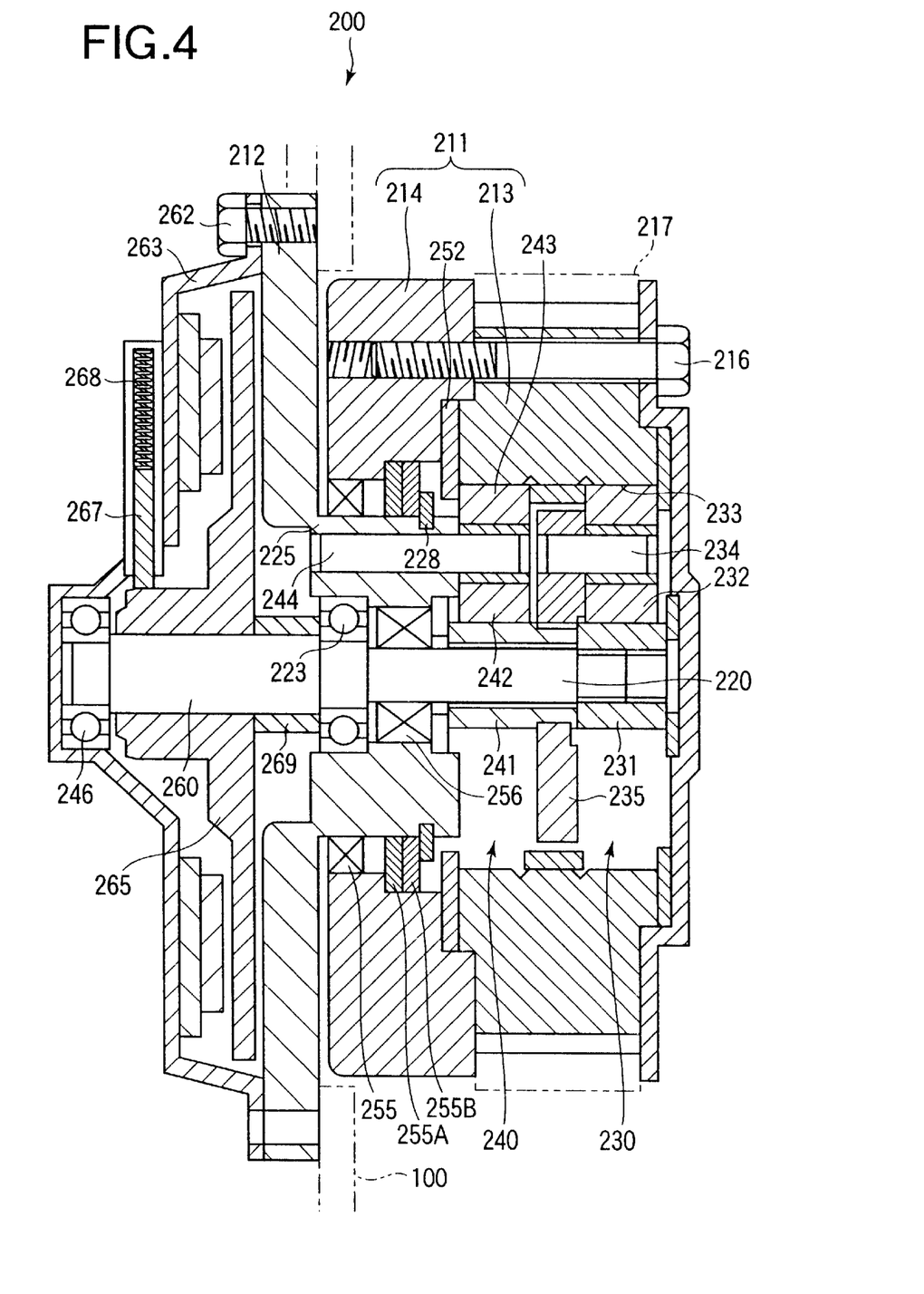
FIG. 4 is a cross-sectional view of a drive unit showing a third embodiment of the present invention.

Now, a third embodiment of the present invention will be explained below with reference to FIG. 4.

In this third embodiment, the bearing 24 according to the previous first embodiment is not employed.

Since the bearing 24 is not employed, this embodiment is, in particular, slightly inferior to the previous embodiment in receiving the thrust and the radial load from the rotational casing 211. However, the elimination of the bearing 24 contributes to the provision of a further simplified entire structure and shortened axial length.

Among other things, the shortening of the axial length contributes not only to improving compactness of the entire outer dimensions of the power transmission unit 200 but also to shortening the distance from the mounting flange 212 to where a load is applied. This provides higher rigidity for the entire assembly and makes it possible to prevent the ring roller from being easily affected even by the same amount of thrust and radial load. Thus, when applied to where only a slight thrust load is imposed, this configuration can maintain a sufficient performance, also providing a more compact apparatus at a lower cost.

Incidentally, sealing members are denoted at reference numerals 255, 255A, and 255B in the figure. Some of the sealing members are arranged side by side near where the bearing 24 is disposed in the previous embodiment. The absence of the bearing provides a space allowance to thereby facilitate the arrangement of the sealing members 255, 255A, 255B, also further facilitating the assembly of the entire apparatus and making full use of the sealing function of each of the sealing members.

Other configuration remains unchanged in principle from the previous first embodiment and thus the components same as or similar to those of the figure are simply given the reference numerals, the lower two digits of which are the same as those of the previous embodiment, and will not be repeatedly explained.

Incidentally, the configuration having no bearing 24 therein is also naturally applicable to the previous second embodiment (of one stage type).

Now, a fourth embodiment of the present invention will be explained below with reference to FIG. 5.

Figure 5:
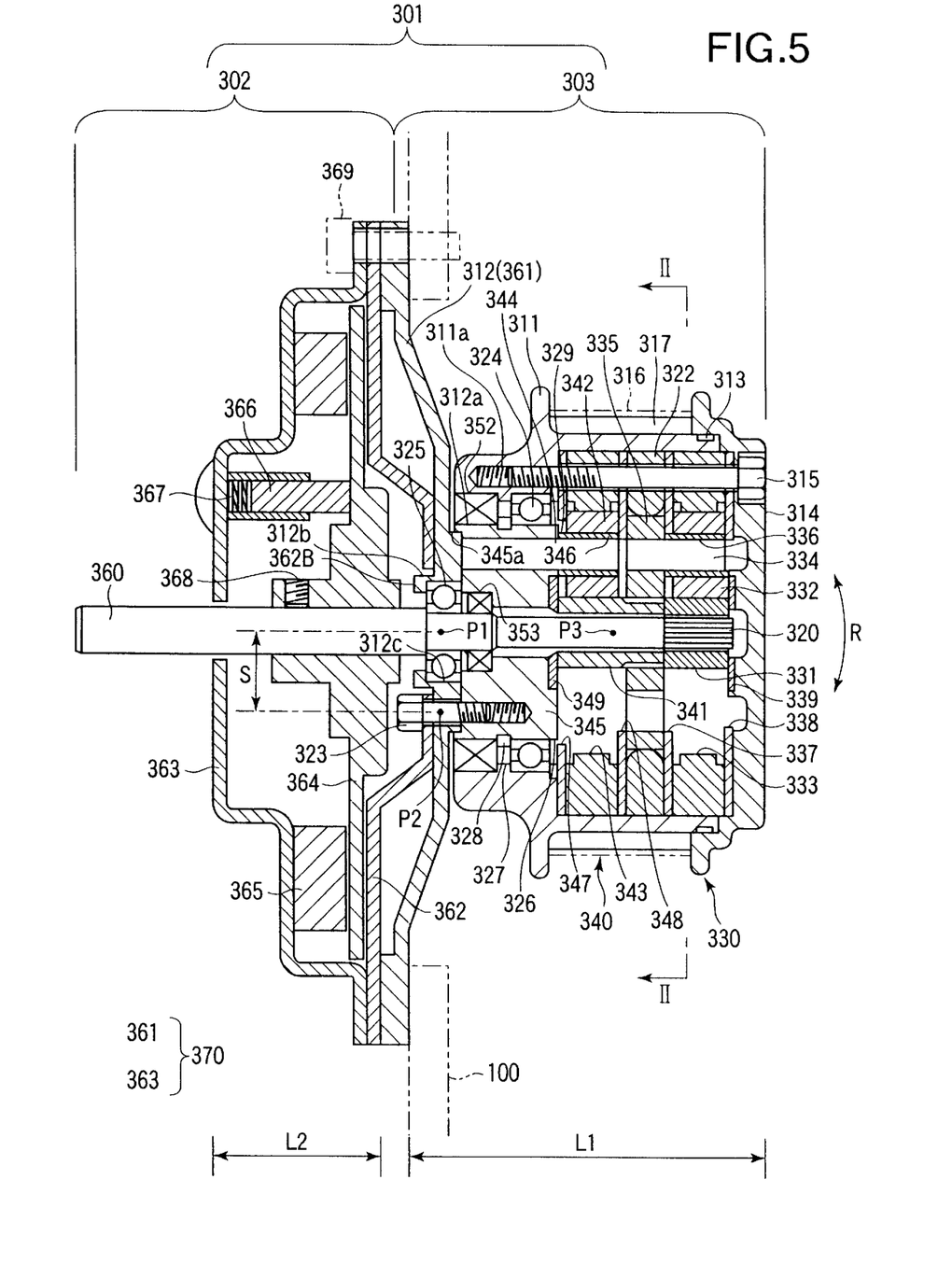
FIG. 5 is a cross-sectional view of a drive unit showing a fourth embodiment of the present invention.

As shown in FIG. 5, a power transmission apparatus 301 equipped with a motor includes a motor unit 302 and a power transmission unit 303, which are combined together adjacent to each other on the axial direction to form a single unit. Here, the motor unit 302 is constituted by a flat brush motor having its axial dimension compressed, and the power transmission unit 303 includes two stages of planetary roller units.

The power transmission unit 303 includes the two stages of or first and second planetary roller units 330, 340 on the outer periphery of an input shaft 320. This basic structure is the same as that of the previous first or third embodiment with a slightly different specific configuration.

That is, the power transmission unit 303 includes a rotational casing 311 (output member) and a mounting flange 312. The rotational casing 311 is integrally coupled by means of a through-bolt 315 (securing member) to an end surface cover 314 for sealing, via an O-ring 313, the end surface opposite to the motor unit 302 in the axial direction.

The first planetary roller unit 330 has a ring-shaped side plate 337 interposed between and in contact with a ring roller 333 and a carrier 335. Also arranged is a ring-shaped side plate 338 in contact with and on the side of the ring roller 333 away in the axial direction from the motor unit 302.

The outer diameter of the side plate 337 is generally the same as that of the ring roller 333, is greater than the maximum diameter of the revolution locus of a pin roller 336, and has an inner diameter smaller than the maximum diameter of the revolution locus of a planetary roller 332 and the outer diameter of the carrier 335. These dimensions are intended to prevent the interference between the pin roller 336 and the side plate 337 and separate the planetary roller 332 from the carrier 335 in the axial direction.

On the other hand, the outer diameter of the side plate 338 is generally the same as that of the ring roller 333. However, the inner diameter thereof is made generally the same as the maximum diameter of the revolution locus of a carrier pin 334 to restrict the axial movement of the pin roller 336.

Similarly, the second planetary roller unit 340 has a side plate 347 disposed adjacent to a ring roller 343 on the side of the motor unit 302 in the axial direction. Also arranged is a side plate 348 in contact with and between the ring roller 343 and the carrier 335.

In addition, a ring-shaped side plate 339 which is fitted into the end surface cover 314 restricts the axial movement of a sun roller 331 away from the motor unit 302. On the other hand, a ring-shaped side plate 349 which is fitted into a carrier 345 restricts the axial movement of a sun roller 341 toward the motor unit 302.

Furthermore, a ring-shaped spacer 322 having generally the same width as that of the carrier 335 is interposed between the side plate 337 and the side plate 348. The spacer 322 has generally the same outer diameter as that of the ring rollers 333, 343 and an inner diameter larger than the outer diameter of the carrier 335.

The ring rollers 333, 343, the side plates 337, 338, 347, 348, and the spacer 322 are fitted into the rotational casing 311, with the side plate 347 being in contact with the axial inner wall of the rotational casing 311 at its end surface on the side of the motor unit 302. In addition, the side plate 338 is in contact with the end surface cover 314 at the end surface opposite to the motor unit 302.

The ring rollers 333, 343, the side plates 337, 338, 347, 348, and the spacer 322 have a plurality of axial through-holes arranged at equal intervals along the periphery. The through-bolt 315 penetrates the through-holes from the end surface cover 314 on the end portion opposite to the carrier 345 (on the counter-carrier side) and leads to an extended portion 311a which is located closer to the motor unit 302 (to the carrier side) than the ring roller 343 of the rotational casing 311.

This allows the ring rollers 333, 343, the side plates 337, 338, 347, 348, and the spacer 322 to be integrated with the rotational casing 311 and the end surface cover 314, with the axial movement of the carrier 335 being restricted by the side plates 337, 348.

Similarly, the axial movement of the planetary roller 332 is limited by means of the side plates 337, 338, while the axial movement of a planetary roller 342 is limited by means of the side plates 347, 348.

The carrier 345 of the second planetary roller unit 340 is cylindrical and in contact with the mounting flange 312 at the end surface on the side of the motor unit 302.

In addition, the rotational casing 311 is extended toward the carrier 345. There is interposed a ball bearing or a bearing 324 between the inner periphery of the extended portion 311a of the rotational casing 311 and the outer periphery of the carrier 345.

There is also provided a ball bearing or a center bearing 325 around the axial center of the mounting flange 312. The center bearing 325 rotatably supports with its own inner ring a motor shaft 360, that is, an end of the input shaft 320 extended from the motor shaft 360.

At a position on the outer periphery of the center bearing 325, the mounting flange 312 and the carrier 345 are fixedly coupled to each other with a bolt 323. The bolt 323 is offset from the center P1 of the center bearing 325 by distance S (between P1 and P2 in FIG. 1). This makes it possible to positively prevent the rotation of the entire planetary roller unit about P1 (rotation R of P3 about P1 in FIG. 1), resulting in supporting the rotational casing 311 with higher stability.

As described above, the rotational casing 311 integrated with the ring rollers 333, 343 is rotatably supported with respect to the input shaft 320 extended from the motor shaft 360 by means of the bearing 324 on the outer periphery of the carrier 345 in addition to the center bearing 325 provided on the mounting flange 312 and the bearing function of the first and second planetary roller units 330, 340.

In addition, the bearing 324 interposed between the carrier 345 and the rotational casing 311 is secured to the carrier 345 and the rotational casing 311 by means of steps 326, 327, a snap ring 328, and a spacer 329 so as not to move axially. The bearing 324 is adapted to support the thrust load which is caused by the rotational casing 311 in the direction away from the motor unit 302.

Incidentally, the thrust load which is caused by the rotational casing 311 toward the motor unit 302 is supported by means of the carrier 345 via the end surface cover 314, the side plate 339, the sun roller 331, the sun roller 341, and the side plate 349.

As described above, this prevents the thrust loads from being transmitted toward the planetary roller units 330, 340.

In addition, there is a sealing member 352 for sealing it from outside, which is interposed between the carrier 345 and the rotational casing 311 and located outside the bearing 324 when viewed from the planetary roller units 330, 340. A sealing member 353 for sealing it from the motor unit 302 is also interposed between the carrier 345 and the input shaft 320 inside the center bearing 325 when viewed from the planetary roller units 330, 340. A special grease is sealed within the space defined by these sealing members 352, 353 and the O-ring 313 to improve the traction function of each roller of the planetary roller units 330, 340.

The structure of the mounting flange 312 is slightly different from the previous embodiment.

As described above, the mounting flange 312 is designed to secure the power transmission apparatus 301 equipped with a motor according to this embodiment to the exterior member 100 and is arranged on the side of the power transmission unit 303 adjacent to the motor unit 302 in the axial direction. The mounting flange 312 is adapted to serve also as a motor base 361 or part of the casing of the motor unit 302, with the vicinity of the inner periphery of the mounting flange 312 being orthogonal to the axial direction of the power transmission apparatus 301 equipped with the motor.

As described above, the mounting flange 312 is fixedly coupled to one end of the carrier 345 of the second planetary roller unit 340 by means of the bolt 323. Thus, securing the mounting flange 312 to the exterior member 100 causes the carrier 345 of the second planetary roller unit 340 to be fixedly supported, thereby allowing rotational output to be taken from the rotational casing 311. The secureness also allows the motor unit 302 to be fixed to the exterior member 100 via the mounting flange 312.

The mounting flange 312 is spigot joined to an annular recessed portion 345a of the carrier 345 at an annular projected portion 312a on the side of the power transmission unit 303. The mounting flange 312 is also spigot joined to a center hole 362b of a magnetic path organizer 362 at an annular projected portion 312b on the side of the motor unit 302 and supports the center bearing 325 at a center hole 312c of the annular projected portions 312a, 312b.

By maintaining the concentricity of these annular projected portions 312a, 312b and the center hole 312c, it is made possible to maintain the concentricity of the motor unit 302, the power transmission unit 303, and the motor shaft 360 (the input shaft 320) after having been assembled.

In addition, the axial side surface of the mounting flange 312 is spaced apart by a small gap from and opposed to the axial end surface of the rotational casing 311 and is arranged as close to the rotational casing 311 as possible, thereby allowing the axial dimension of the power transmission apparatus 301 equipped with the motor to be shortened.

Now, the configuration of the motor unit 302 will be explained below.

The motor unit 302 includes a flat brush motor, with a casing 370 being constituted by the motor base 361 and a motor cover 363. The mounting flange 312 totally serves also as the motor base 361. In this regard, this embodiment is principally the same as the previous embodiment, but is slightly different therefrom in the basic configuration.

The motor unit 302 includes the motor shaft 360 integrated with the input shaft 320 of the power transmission unit 303, the motor cover 363 disposed opposite to the power transmission unit 303 in the axial direction, and a thin disc-shaped rotor 364 integrally coupled to the outer periphery of the motor shaft 360 inside the motor cover 363. The motor unit 302 further includes a stator 365 secured on the inner surface of the motor cover 363 so as to oppose the side surface of the rotor 364, brushes 366 for supplying current to the coil (not shown) of the rotor 364, and a spring 367 for bringing the brushes 366 into contact with the contacts of the disc surface of the rotor 364.

The magnetic path organizer, denoted at reference numeral 362 in the figure, serves also as a reinforcement and is bolted with the bolt 323. The axial movement of the rotor 364 and the motor shaft 360 is also restricted by means of a set screw 368.

Incidentally, the end portion opposite to the power transmission unit 303 of the motor shaft 360 (to the left in the figure) is projected from the motor cover 363. This projected portion is used such as for mounting a rotary encoder or the like. If it is not necessary to mount the rotary encoder or the like, the motor shaft 360 may be shortened so that it can be accommodated within the motor cover 363.

As described above, the power transmission apparatus 301 equipped with a motor is mounted to an elevator cage in the same manner as in the aforementioned embodiment (as shown in FIG. 6) by securing the mounting flange 312 to the exterior member 100 with a bolt 369.

In the fourth embodiment, the bearing 324 is intentionally interposed between the rotational casing 311 and the carrier 345. This makes it possible to reduce the burden imposed on the planetary roller units 330, 340 and provide higher stability of rotational support for the rotational casing 311.

That is, the bearing 324 is adapted to receive the thrust load acting upon the rotational casing 311 away from the motor unit 302 and part of the radial load. This makes it possible to allow the planetary rollers 332, 342 to rotate with stability even when the rotational casing 311 is installed so as to be subject to a heavy thrust or radial load.

Incidentally, in the case where a thrust load acts upon the rotational casing 311 toward the motor unit 302, the thrust load is supported with the carrier 345 via the end surface cover 314, the side plate 339, the sun roller 331, the sun roller 341, and the side plate 349. Thus, the thrust load is not acted upon the planetary rollers 332, 342, thereby allowing the planetary rollers 332, 342 to rotate also with stability.

In addition, the carrier 335 and the planetary rollers 332, 342 rotate while being guided by the side plates 337, 338, 347, 348. This prevents a skew caused by errors in machining, thereby providing a smoothed rotation and a quiet operation for the carrier of the planetary roller units and for each roller.

Moreover, the front and reverse sides of the side plates are used, thereby making it possible to restrict the axial movement of the carriers and planetary rollers with a less number of components.

Furthermore, in some cases, the carriers 335, 345 and the planetary rollers 332, 342 may generate a thrust load caused by machining errors while rolling to move in the axial direction. However, the side plates 337, 338, 347, 348 are designed to restrict the axial movement of the carriers 335, 345 and the planetary rollers 332, 342. Thus, the thrust load acts only between the carrier or the planetary roller and the adjacent side plate, never acting upon the other carrier and planetary roller. This makes it possible to minimize the sliding resistance of the planetary roller units caused by the thrust load, thus allowing the carriers and the planetary rollers to rotate smoothly and quietly.

Incidentally, the power transmission apparatus 301 equipped with a motor according to the fourth embodiment is provided with the two stages of planetary roller units 330, 340. However, only one stage of planetary roller unit may be provided, or three or more stages may naturally be employed.

In addition, in the aforementioned embodiments, the motor unit employs a flat brush motor but is not limited thereto.

Moreover, the motor unit and the power transmission unit are not necessarily integrated to form one drive unit 1, but may be separately prepared to couple to each other.

Furthermore, in any embodiments described above, "an extended portion of the frame member" or the bearing casing is formed separately from and then coupled to the main body of the frame member or the rotational frame. However, as a matter of course, the bearing casing and the rotational frame may be integrated from the beginning.

Furthermore, the aforementioned embodiments employ a so-called simple planetary roller unit as the planetary roller unit, however, the planetary roller unit according to the present invention does not necessarily need to employ a simple planetary roller unit and specifically depend on the type thereof, either. For example, the present invention may employ such a frictional transmission as disclosed in Japanese Patent Laid-Open Publication No.Hei 6-241285 or a known roller structure which is called a traction transmission type of wave speed change gear. In this case, when a flexible ring member is employed as an output member in the wave speed change gear, the flexible ring member may be regarded as the ring roller of the present invention.

Furthermore, when a rigid ring member on the outer periphery of the flexible ring member is used as the output member, the rigid ring member may be regarded as the ring roller of the present invention. In this case, the rigid ring member can also be regarded as the "frame member" of the present invention.

As described above, according to the present invention, a planetary roller unit is interposed between a motor unit and a timing belt, thereby making it possible to reduce the noise and dimensions of the apparatus while the apparatus is still provided with a mechanical safety function for use upon generation of an excessive load.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A belt-type door opening and closing drive apparatus for allowing an output of a motor unit to drive a belt to thereby open and close a door, wherein
    a planetary roller unit comprising a sun roller, a planetary roller circumscribing said sun roller, and a ring roller with which said planetary roller is inscribed in is interposed between said motor unit and said belt,
    said planetary roller unit receives the output from said motor unit and an output of said planetary roller unit is transmitted to said belt, wherein said belt is on a pulley that rotates said belt and encompasses said planetary roller unit.

2. The belt-type door opening and closing drive apparatus according to claim 1, wherein said motor unit comprises a flat motor having a shortened axial dimension.

3. The belt-type door opening and closing drive apparatus according to claim 1, wherein said planetary roller unit is of a frame rotational type comprising a rotational frame member on an outer periphery of the unit itself, said frame member is coupled to said ring roller so as to rotate integrally therewith, and said frame member itself is provided with a pulley for driving said belt.

4. The belt-type door opening and closing drive apparatus according to claim 3, wherein said ring roller and said frame member are integrated with each other by a securing member penetrating the ring roller to the frame member or to an extended portion of said frame member.

5. A belt-type door opening and closing apparatus for allowing an output of a motor unit to drive a belt to thereby open and close a door, wherein
    a planetary roller unit comprising a sun roller, a planetary roller circumscribing said sun roller, and a ring roller with which said planetary roller is inscribed in is interposed between said motor unit and said belt,
    said planetary roller unit receives the output from said motor unit and an output of said planetary roller unit is transmitted to said belt,
    wherein said planetary roller unit is of a frame rotational type comprising a rotational frame member on an outer periphery of the unit itself, said frame member is coupled to said ring roller so as to rotate integrally therewith, and said frame member itself is provided with a pulley for driving said belt,
    said planetary roller unit is provided as multiple stages of planetary roller units,
    said output from said motor unit is received by the sun roller of an initial stage planetary roller unit of said multiple stages of planetary roller units,
    a carrier for supporting the planetary roller of the planetary roller unit of a preceding stage including the initial stage is coupled in turn to the sun roller of a following stage planetary roller unit, and then the carrier of a final stage planetary roller unit is fixed, and
    at least the ring roller of the final stage planetary roller unit is integrally rotatably coupled to said frame member, thereby making said frame member rotatable.

6. A belt-type door opening and closing drive apparatus for allowing an output of a motor unit to drive a belt to thereby open and close a door, wherein
    a planetary roller unit comprising a sun roller, a planetary roller circumscribing said sun roller, and a ring roller with which said planetary roller is inscribed in is interposed between said motor unit and said belt,
    said planetary roller unit receives the output from said motor unit and an output of said planetary roller unit is transmitted to said belt,
    wherein said planetary roller unit is of a frame rotational type comprising a rotational frame member on an outer periphery of the unit itself, said frame member is coupled to said ring roller so as to rotate integrally therewith, and said frame member itself is provided with a pulley for driving said belt,
    said planetary roller unit secures a carrier for supporting said planetary roller to the motor unit,
    a mounting flange for mounting the drive apparatus to an exterior member is formed on said carrier opposite to the planetary roller unit, and
    the mounting flange is used as part of a casing of the motor unit.

7. A belt-type door opening and closing drive apparatus for allowing an output of a motor unit to drive a belt to thereby open and close a door, wherein
    a planetary roller unit comprising a sun roller, a planetary roller circumscribing said sun roller, and a ring roller with which said planetary roller is inscribed in is interposed between said motor unit and said belt,
    said planetary roller unit receives the output from said motor unit and an output of said planetary roller unit is transmitted to said belt,
    wherein said planetary roller unit is of a frame rotational type comprising a rotational frame member on an outer periphery of the unit itself, said frame member is coupled to said ring roller so as to rotate integrally therewith, and said frame member itself is provided with a pulley for driving said belt, wherein a bearing is disposed between an outer periphery of a carrier for supporting said planetary roller of said planetary roller unit and an inner periphery of said frame member or an extended portion of said frame member.

8. The belt-type door opening and closing drive apparatus according to claim 7, wherein said drive apparatus is configured to prevent an axial movement of said frame member via said bearing, and said bearing prevents a thrust load acted upon by said frame member from being transmitted toward the planetary roller unit.

9. A belt-type door opening and closing drive apparatus for allowing an output of a motor unit to drive a belt to thereby open and close a door, wherein a planetary roller unit comprising a sun roller, a planetary roller circumscribing said sun roller, and a ring roller with which said planetary roller is inscribed in is interposed between said motor unit and said belt, said planetary roller unit receives the output from said motor unit and an output of said planetary roller unit is transmitted to said belt, wherein said planetary roller unit is of a frame rotational type comprising a rotational frame member on an outer periphery of the unit itself, said frame member is coupled to said ring roller so as to rotate integrally therewith, and said frame member itself is provided with a pulley for driving said belt, wherein a flange is fixedly coupled to an end portion of a carrier opposite to the planetary roller unit, the carrier supporting the planetary roller of said planetary roller unit, and a center bearing is disposed around an axial center of the flange, the disposed center bearing supports an end of a motor shaft and the motor shaft is extended to penetrate said carrier and coupled to said sun roller, said center bearing and a bearing function of said planetary roller unit itself are employed to support the frame member integrated with said ring roller rotatably around said extended motor shaft.

10. The belt-type door opening and closing drive apparatus according to claim 9, wherein said motor shaft is extended from said center bearing and supported in a cantilever manner within a casing of said motor unit by said center bearing and the bearing function of said planetary roller unit itself.

11. The belt-type door opening and closing drive apparatus according to claim 9, wherein a plurality of stages of said planetary roller units are arranged side by side on said extended motor shaft, a plurality of ring-shaped plates are arranged so as to contact with a part of or entire surface of an axial side of the carrier of each stage, and axial movement of the carrier is restricted by means of preceding and following ring-shaped plates.

12. A belt-type door opening and closing drive apparatus for allowing an output of a motor unit to drive a belt to thereby open and close a door, wherein a planetary roller unit comprising a sun roller, a planetary roller circumscribing said sun roller, a carrier supporting said planetary roller, and a ring roller with which said planetary roller is inscribed in is interposed between said motor unit and said belt, said sun roller of said planetary roller unit receives the output from said motor unit, said carrier is fixed and an output of said planetary roller unit is transmitted to said belt, wherein said belt is on a pulley that rotates said belt and encompasses said planetary roller unit.

13. A belt-type door opening and closing drive apparatus according to claim 12, wherein said carrier is fixed to a casing of said motor unit.

* * * * *